(12) United States Patent
Yin

(10) Patent No.: US 7,346,092 B1
(45) Date of Patent: Mar. 18, 2008

(54) DIODE SIDE PUMPED HIGH PULSE ENERGY ND:YLF LASERS

(75) Inventor: Yusong Yin, Stonybrook, NY (US)

(73) Assignee: Photonics Industries Int'l., Bohemia, NY (US)

( * ) Notice: Subject to any disclaimer, the term of this patent is extended or adjusted under 35 U.S.C. 154(b) by 51 days.

(21) Appl. No.: 11/303,245

(22) Filed: Dec. 16, 2005

(51) Int. Cl.
*H01S 3/091* (2006.01)

(52) U.S. Cl. .......................................... 372/75; 372/10
(58) Field of Classification Search .................. 372/10, 372/75
See application file for complete search history.

(56) References Cited

U.S. PATENT DOCUMENTS

| | | | |
|---|---|---|---|
| 5,774,488 A | 6/1998 | Kmetec | |
| 5,778,020 A | 7/1998 | Gokay | |
| 7,082,149 B1 * | 7/2006 | Yin et al. | 372/75 |
| 2001/0033596 A1 * | 10/2001 | Tsunekane et al. | 372/72 |
| 2004/0183018 A1 * | 9/2004 | Zhou et al. | 250/341.1 |
| 2006/0259021 A1 * | 11/2006 | Lin | 606/4 |

* cited by examiner

Primary Examiner—Michael Dung Nguyen
(74) Attorney, Agent, or Firm—James A. Quinton

(57) ABSTRACT

According to the invention, a diode side pumped laser is provided. The laser has an optical cavity formed between a first and a second reflective surface. A Nd:YLF lasing medium is located within the cavity along its optical axis. The Nd:YLF lasing medium can desirably be a single Nd:YLF lasing rod which has a length of 90 mm or more. A plurality of diode bars are provided in optical communication with the Nd:YLF lasing medium preferably a lasing rod. The diode bars extend along substantially the pumpable length of the lasing rod and radially around the periphery of the lasing rod. The diode bars have radiation outlets in optical communication with the lasing rod for supplying electromagnetic radiation on pumping paths to the rod. The lasing rod receives an average linear power density from the diode bars of less than 50 watts/cm. The pumping paths traverse substantially the entire pumpable length of the lasing rod substantially perpendicular to the direction of propagation of energy in the laser cavity. The pumping paths traverse the lasing rod from at least two directions on substantially intersecting paths. The resulting laser produces 30 mj or more per pulse.

29 Claims, 5 Drawing Sheets

DIODE SIDE PUMPED HIGH PULSE ENERGY ND:YLF LASERS

FIELD OF THE INVENTION

The present invention relates to diode side pumped high pulse energy Nd:YLF lasers.

BACKGROUND OF THE INVENTION

Diode side pumped lasers are well known in the art, see U.S. Pat. Nos. 5,778,020 and 5,774,488. For producing high power output from side-pumped solid state lasers, a number of diode bars have been tightly packed together to pump Nd:YAG lasing rod from symmetrically oriented multi-angles to produce high average power. However this approach has been problematic in Nd:YLF lasers. In Nd:YLF lasers, high pumping intensity along with high laser peak intensity and high average power often results in damage of the laser crystals. Prior art devices have used linearly spaced diode bars for high power applications to produce pumping energy on non-intersecting paths to avoid this problem. However it would be desirable to compactly locate the diode bars radially around the Nd:YLF lasing rod. A high pulse energy from Nd:YLF laser at fundamental or second, third or fourth harmonic wavelength at kHz repetition rates is desirable in many applications such as pumping short pulse amplifiers, dye lasers, high speed particle image velocimetry, laser welding and the like.

SUMMARY OF THE INVENTION

According to the invention, a diode side pumped laser is provided. The laser has an optical cavity formed between a first and a second reflective surface. A Nd:YLF lasing medium is located within the cavity along its optical axis. The Nd:YLF lasing medium is desirably a single Nd:YLF laser rod having a length of 90 mm or more. A plurality of diode bars are provided in optical communication with the Nd:YLF lasing medium preferably a lasing rod. The diode bars extend along substantially the pumpable length of the lasing rod and radially around the periphery of the lasing rod. The diode bars have radiation outlets in optical communication with the lasing rod for supplying electromagnetic radiation on pumping paths to the rod. The lasing rod receives an average linear power density from the diode bars of less than 50 watts/cm. The pumping paths traverse substantially the entire pumpable length of the lasing rod substantially perpendicular to the direction of propagation of energy in the laser cavity. The pumping paths traverse the lasing rod from at least two directions on substantially intersecting paths. The resulting laser is capable of producing 30 mj or more per pulse.

In another aspect of the invention, a high pulse energy intracavity harmonic laser is provided. One or more harmonic crystals are desirably located within the laser cavity to generate a high pulse energy harmonic beam.

It is an object of the invention to provide a high pulse energy laser which can be pumped at high power without damaging the lasing crystal.

It is an object of the invention to provide a high pulse energy Nd:YLF harmonic laser having operational longevity.

The preferred embodiment of the present invention is illustrated in the drawings and examples. However, it should be expressly, understood that the present invention should not be limited solely to the illustrative embodiment.

DETAILED DESCRIPTION OF THE INVENTION

Figure 1:
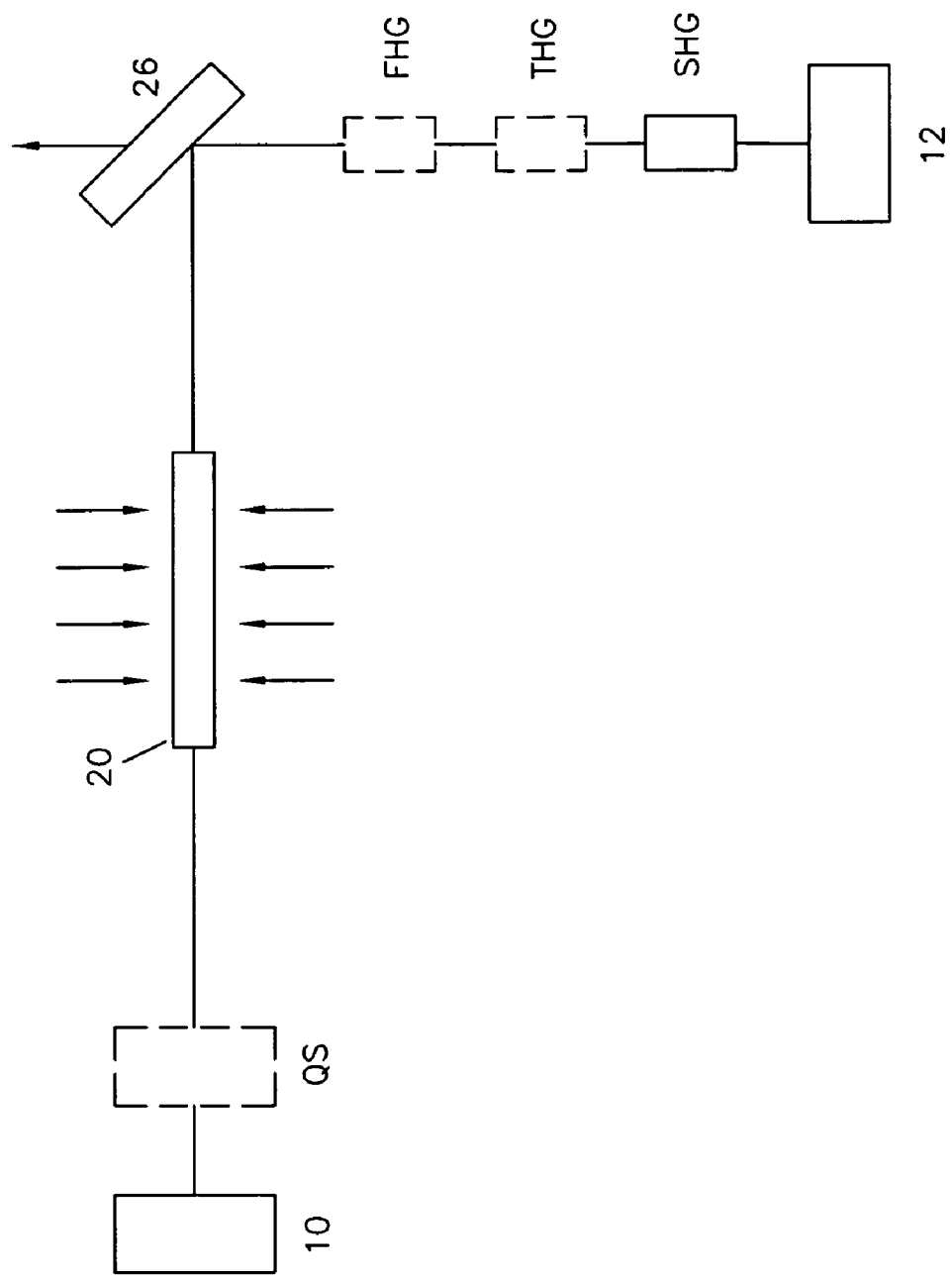
FIG. 1 is a schematic view the laser according to the invention.
Figure 2:
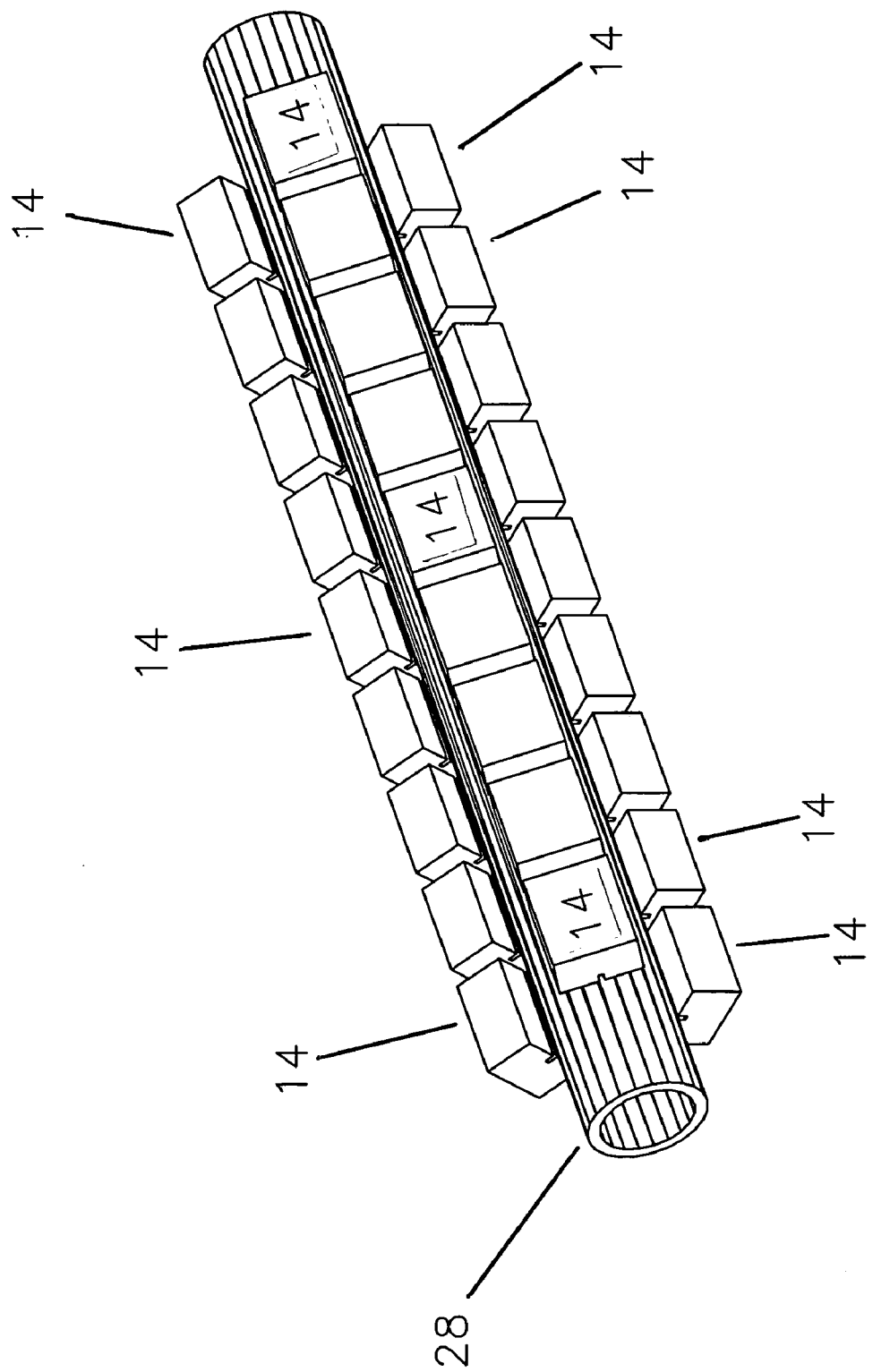
FIG. 2 is a partial perspective view of a laser according to the invention showing the laser mounting tube and the diode bar assembly.
Figure 3:
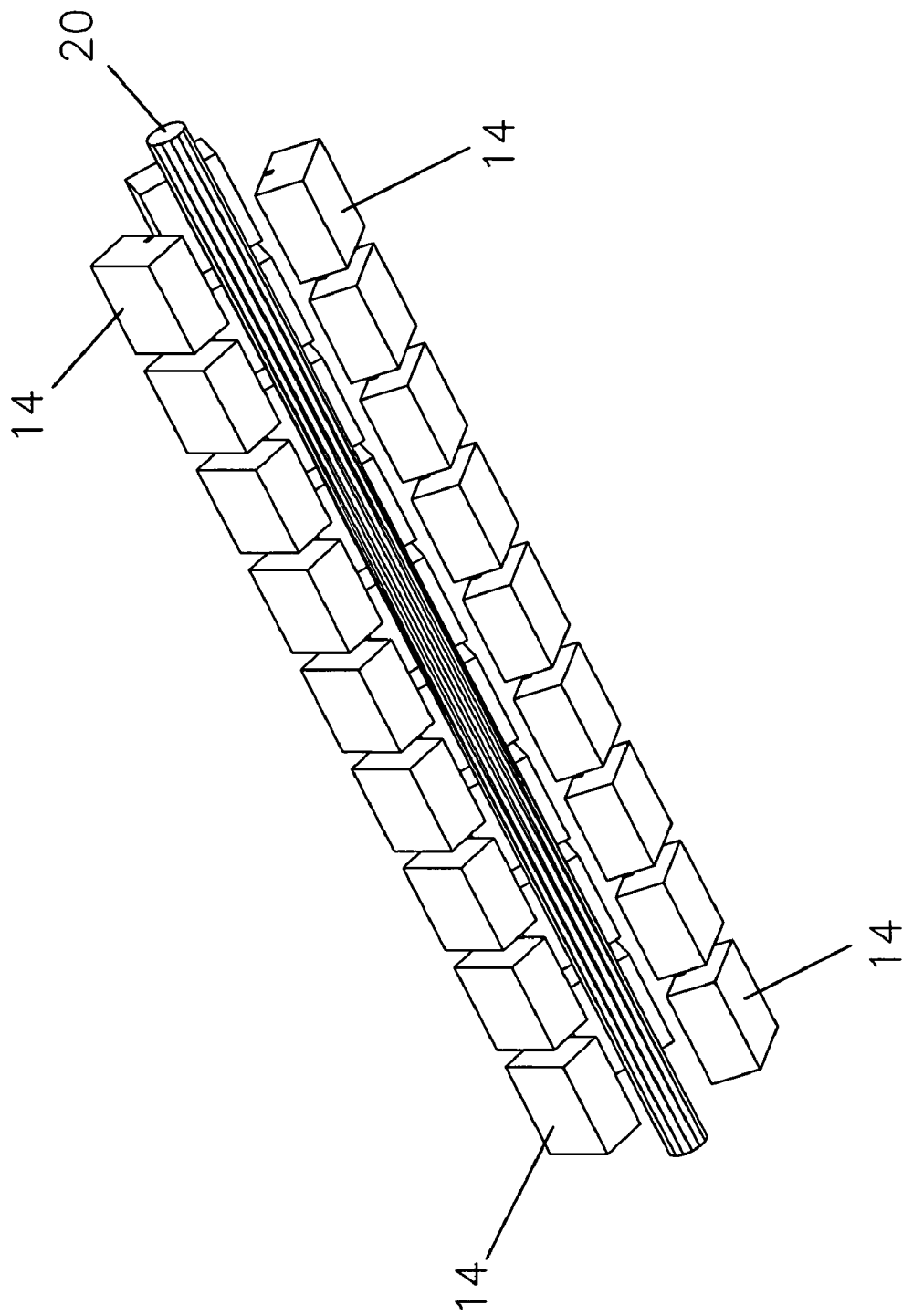
FIG. 3 is a partial perspective view of the laser of FIG. 2 showing the lasing rod and the diode bar assembly.
Figure 4:
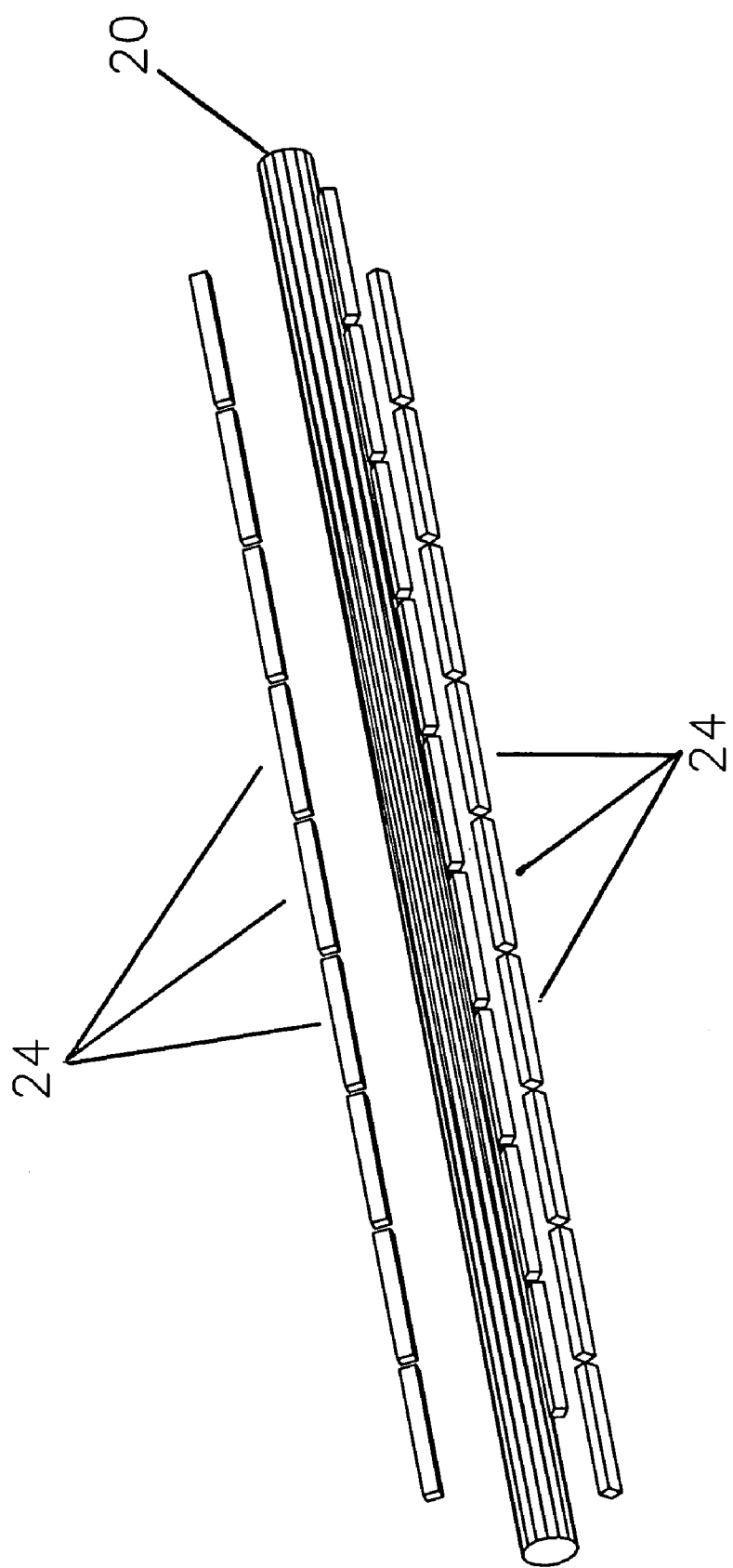
FIG. 4 is a partial perspective view of FIG. 2 without the diode bar housing.

According to the invention, a diode side pumped laser is provided. The laser has an optical cavity formed between a first and a second reflective surface. A Nd:YLF lasing medium is located within the cavity along its optical axis. The Nd:YLF lasing medium is desirably a single Nd:YLF lasing rod. The lasing rod can have a variety of cross sections desirably circular, rectangular or square. Typically the lasing rod is a cylindrical rod. Desirably the rod has a relatively long length desirably 90 mm or greater in length, more desirably 100 mm preferably 120 mm or greater in length. The lasing medium can be desirably a single lasing rod or optionally two or more lasing rods.

It has been found that Nd:YLF crystal rods suffer damage to the crystal when they are subjected to an average linear power density of 50 watts/cm and above from diode side pumping. Some instances of cracking damage can occur at 45 watts/cm while substantially no damage occurs at 40 watts/cm. Thus it was concluded that the linear power density in the Nd:YLF crystal should be less than 50 watts/cm preferably 45 watts/cm and desirably 40 watts/cm or less. This limitation on the linear power density limits the average power of Nd:YLF lasers which have been typically used. Such crystals were often small in length having been chosen to enhance the compactness of lasers. By using an Nd:YLF laser having a length of 90 mm or greater preferably 110 mm, high pulse power can be achieved even with the limitation of 40 to 50 watts/cm on the average linear power density supplied by the diode bars.

A plurality of diode bars are provided in optical communication with the Nd:YLF lasing medium preferably a lasing rod. Sufficient diode bars are provided to effectively pump the lasing rod desirably through its pumpable length. The diode bars extend along the length of the lasing rod preferably along substantially the entire pumpable length of the rod and radially around the periphery of the lasing rod to effectively pump the rod but at a linear power density of less than about 50 watts/cm preferably at about 45 watts/cm or less desirably at about 40 watts/cm or less. The number and pumping power of the diode bars are selected depending on the repetition rate, pulse energy, average power desired and maintaining the linear power density in the rod from the diode bars to less than 50 watts/cm preferably 45 watts/cm or less. Desirably, the diodes are symmetrically arranged around the periphery of the lasing rod.

Usually a Nd:YLF lasing rod cannot be side pumped through its entire length because the ends of the rods are placed in mounting clamps and the like and mounted in water or liquid cooling systems. Typically 10 to 20 mm of crystal length is lost due to such mounting mechanisms. The diode bars have radiation outlets in optical communication with the lasing rod for supplying electromagnetic radiation on pumping paths to the rod. The lasing rod receives a linear power density from the diode bars of less than about 50 watts/cm preferably at about 45 watts/cm or less desirably at about 40 watts/cm or less.

The pumping paths traverse the length of the lasing rod preferably substantially the entire pumpable length of the rod substantially perpendicular to the direction of propagation of energy in the laser cavity. The pumping paths traverse the lasing rod from at least two directions on substantially intersecting paths. Desirably the pumping paths traverse the lasing rod from two (2) to four (4) directions preferably two (2) directions on substantially intersecting paths. The resulting laser produces a pulse energy of 30 mj or more per pulse preferably 40 mj or higher desirably 50 mj or higher. Desirably the laser has a high repetition rate of 1 khz or more.

The diode bars are preferably housed in two or more diode bar assemblies for example two (2) or three (3) assemblies optionally four (4) or more. The diode bars in each assembly are preferably linearly aligned in a group of three or more diode bars desirably five optionally nine or more diode bars in each assembly. The diode bar assemblies are located around the periphery of the Nd:YLF lasing rod. The pumping paths from the diode bars in a diode bar assembly travel on substantially parallel pumping paths through the Nd:YLF lasing rod. At least two of the substantially parallel pumping paths of the diode bar assemblies intersect within the lasing rod preferably all the substantially parallel pumping paths of the diode bar assemblies intersect within the lasing rod.

Referring now to the Figures, a laser having an optical cavity formed between a first reflective surface and a second reflective surface preferably mirrors 10 and 12 is provided. A Q-switch QS is provided in the optical cavity. An Nd:YLF lasing medium preferably an Nd:YLF cylindrical rod 20 is provided in the cavity along the optical axis. Preferably, a single Nd:YLF lasing rod is provided. However, multiple rods in series may be provided. Desirably, the rod has a long length of 80 mm or longer desirably 90 mm to 120 mm. Preferably, Nd:YLF lasing rod 20 has a length of 110 mm. The laser rod 20 is side pumped as will be described in more detail in connection with FIGS. 2 through 5. Desirably, the laser is a harmonic laser and a includes a harmonic generator desirably located between mirror 26 and cavity mirror 12. The harmonic generator can provide for second, third or fourth harmonic operation. For all harmonic operations, a second harmonic crystal SHG is provided between mirrors 26 and 12. In the third harmonic embodiment, a third harmonic crystal THG is provided between the second harmonic crystal SHG and mirror 26. For a fourth harmonic operation, a fourth harmonic crystal FHG is provided between the third harmonic crystal THG and mirror 26. Mirror 26 is highly reflective for fundamental beam and highly transmissive for the harmonic wavelength beam desired and thus acts as the output coupler for the pulsed laser output of the beam. As best seen in FIGS. 2 through 5, the laser rod 20 is pumped by a plurality of diode bars 14 which are in optical communication with the lasing rod 20. Diode bars desirably extend along the length of the lasing rod preferably along substantially the entire pumpable length of the lasing rod and radially around the periphery of the lasing rod to effectively pump rod at a linear power density of less than 50 watts per centimeter preferably at 45 watt/cm or less and desirably at about 40 watts/cm or less.

The number and pumping power of the diode bars is selected depending on the repetition rate, pulse energy and average power desired while maintaining a linear power density in the rod from the diode bars at less than 50 watts per centimeter, preferably 45 watts/cm desirably about 40 watts/cm or less.

As shown in FIGS. 2 through 5, a plurality of diode arrays 24 are desirably packaged into bars 14. The diode bars 14 are preferably thermally connected desirably by soldering for example to a thermally conductive housing desirably a copper block to form a diode bar assembly. The diode bars are preferably linearly aligned in each assembly. The diode bar assemblies 16 are desirably spaced radially around the periphery of rod 20 and preferably extend substantially the entire pumpable length of the rod 20. Desirably two (2) to four (4) diode bar assemblies 16 are provided which desirably include three (3) to twelve (12) diode bars 14 per assembly. In the embodiment of FIGS. 2 to 5, three (3) diode bar assemblies are provided which contain nine (9) diode bars each. The diode bars are located symmetrically around the Nd:YLF crystal 20 to provide a electromagnetic radiation propagation from the bars in an assembly to the crystal on paths which substantially intersect electromagnetic radiation from the diode bars from another assembly. Desirably the rod 20 is mounted in a hollow tube 28. The hollow tube 28 receives liquid such as water for cooling the lasing medium as is conventional in the art. When the diode bars 14 are housed in diode bar assemblies 16, pumping paths from the diode bars in a diode bar assembly preferably travel on substantially parallel pumping paths through the Nd:YLF lasing rod. At least two of the substantially parallel pumping paths of the diode bar assemblies 16 intersect within the lasing rod preferably all the substantially parallel pumping paths of the diode bar assemblies intersect within the lasing rod.

Figure 5:
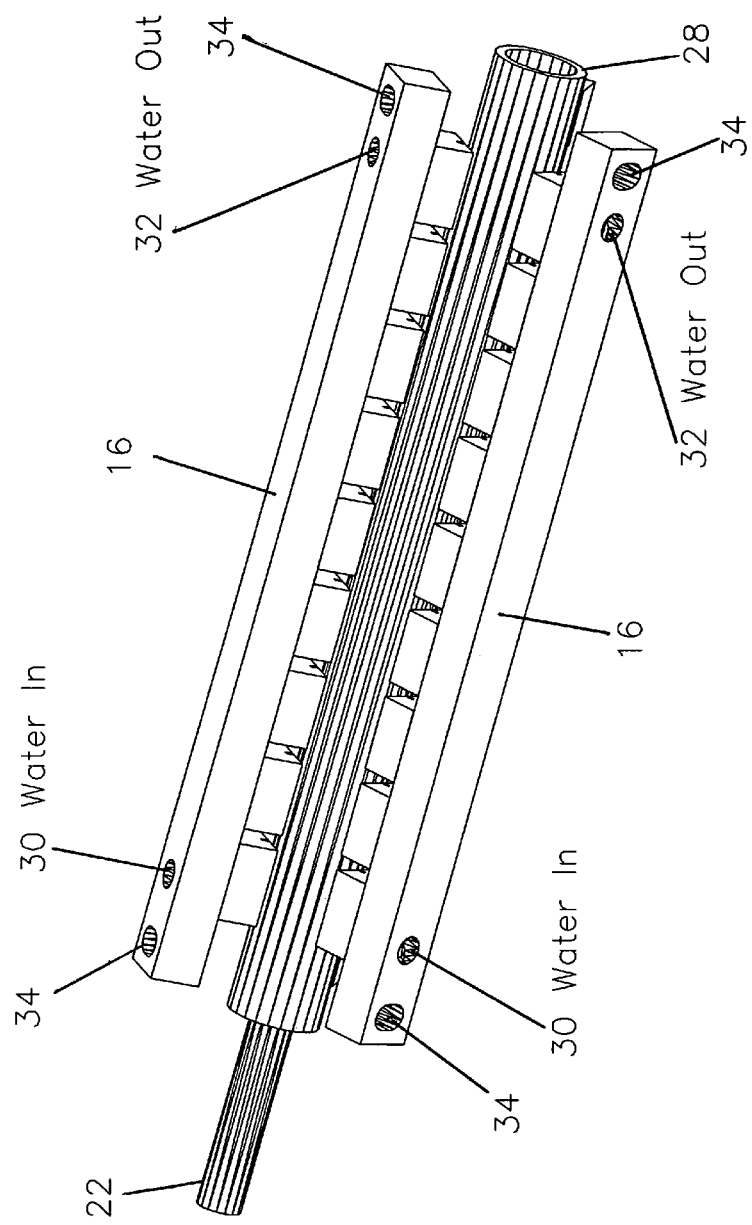
FIG. 5 is a partial perspective view of FIG. 2 with the heat exchanger.

As best seen in FIG. 5, the diode bar assemblies 16 are liquid cooled preferably water cooled. Liquid inlets 30 and liquid outlets 32 are provided for cooling liquid preferably water to be delivered and removed to and from conduits in the assemblies for cooling the diode bars during operation. The crystal 20 is supported by crystal holder 22. Crystal holder 22 is then mounted to a jacket and to the hollow tube 28. The mounting holes 34 are provided to mount the diode assemblies to a laser pumping chamber which is not shown. The resulting laser produces a power output of 30 mj or greater preferably 50 mj or greater.

The foregoing is considered as illustrative only to the principles of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

The invention claimed is:

1. A side pumped Nd:YLF laser comprising:
   a) a laser cavity formed between a first and a second reflective surface;
   b) said laser cavity having an optical axis;
   c) a Q-switch located within the cavity;
   d) at least one Nd:YLF lasing rod located within said cavity along said optical axis;
   e) said lasing rod having a length of at least 90 mm;
   f) diode bars extending along the length of said lasing rod and radially around the periphery of said lasing rod;
   g) said diode bars having radiation outlets in optical communication with said lasing rod for supplying electromagnetic radiation on pumping paths to said rod;

h) said lasing rod receiving a linear power density from said diode bars of less than 50 watts/cm;
i) said pumping paths traversing substantially the entire length of said lasing rod substantially perpendicular to the direction of propagation of energy in the laser cavity;
j) said pumping paths traversing said lasing rod from at least two directions on substantially intersecting paths;
k) said laser capable of producing 30 mj or more per pulse.

2. The side pumped pulsed Nd:YLF laser according to claim 1 wherein said lasing rod has a length 100 mm or greater.

3. The side pumped pulsed Nd:YLF laser according to claim 1 wherein said lasing rod has a length 120 mm or greater.

4. The side pumped pulsed Nd:YLF laser according to claim 1 wherein said lasing rod has a length of 90 mm to 120 mm.

5. The side pumped pulsed Nd:YLF laser according to claim 1 wherein said laser capable of producing a pulse energy of 30 mj to 50 mj.

6. The side pumped pulsed Nd:YLF laser according to claim 1 wherein said laser capable of producing a pulse energy of 50 mj or greater.

7. The side pumped pulsed Nd:YLF laser according to claim 1 wherein said laser is pulsed at about 1 Khz or greater.

8. The side pumped pulsed Nd:YLF laser according to claim 1 wherein said diode bars extend along substantially the entire pumpable length of said rod.

9. The side pumped pulsed Nd:YLF laser according to claim 1 wherein said pumping paths traverse the lasing rod in two (2) to four (4) directions on substantially intersecting paths.

10. The side pumped pulsed Nd:YLF laser according to claim 9 wherein said pumping paths traverse the lasing rod in two (2) directions on substantially intersecting paths.

11. The side pumped pulsed Nd:YLF laser according to claim 1 wherein said lasing rod receiving a linear power density from said diode bars of 45 watts/cm or less.

12. The side pumped pulsed Nd:YLF laser according to claim 1 wherein said lasing rod receiving a linear power density from said diode bars of 40 watts/cm or less.

13. The side pumped pulsed Nd:YLF laser according to claim 1 wherein said diode bars are housed in two or more diode bar assemblies;
   said diode bars linearly aligned in a group of three or more diode bars in each assembly;
   said diode bar assemblies located around the periphery of said Nd:YLF lasing rod;
   said pumping paths from said diode bars in a diode bar assembly traveling on substantially parallel pumping paths;
   said substantially parallel pumping paths of at least two said diode bar assemblies intersecting with one another within said lasing rod.

14. The side pumped pulsed Nd:YLF laser according to claim 1 wherein said diode bars are housed in two diode bar assemblies;
   said diode bars linearly aligned in a group of six or more diode bars in each assembly;
   said diode bar assemblies located around the periphery of said Nd:YLF rod;
   said pumping paths from said diode bars in a diode bar assembly traveling on substantially parallel pumping paths;
   said substantially parallel pumping paths of said diode bar assemblies intersecting with one another within said lasing rod.

15. The side pumped pulsed Nd:YLF laser according to claim 1 wherein said diode bars are housed in three diode bar assemblies;
   said diode bars linearly aligned in a group of six or more diode bars in each assembly;
   said diode bar assemblies located around the periphery of said Nd:YLF lasing rod;
   said pumping paths from said diode bars in a diode bar assembly traveling on substantially parallel pumping paths;
   said substantially parallel pumping paths of said diode bar assemblies intersecting within said lasing rod.

16. The side pumped pulsed Nd:YLF laser according to claim 1 wherein said diode bars are arranged in four diode bar assemblies;
   said diode bars linearly aligned in a group of four or more diode bars in each assembly;
   said diode bar assemblies located around the periphery of said Nd:YLF lasing rod;
   said pumping paths from said diode bars in an diode bar assembly traveling on substantially parallel pumping paths;
   said substantially parallel pumping paths of said diode bar assemblies intersecting within said lasing rod.

17. The side pumped pulsed Nd:YLF laser according to anyone of claims 13 to 16 wherein each said diode bar assembly arranging said diodes linearly in a group of nine or more diode bars.

18. The side pumped pulsed Nd:YLF laser according to claim 1 further comprising a conduit surrounding said crystal;
   a cooling liquid flowing through said conduit.

19. The side pumped pulsed Nd:YLF laser according to any one of claims 13 to 16 further comprising;
   liquid channels located through substantially the entire length of said diode bar assemblies in thermal communication with said diode bars to remove heat from said diode bars;
   a cooling liquid flowing through said channels.

20. The side pumped pulsed Nd:YLF laser according to claim 19 wherein said cooling liquid is water.

21. The side pumped pulsed Nd:YLF laser according to claim 1 further comprising a second harmonic generator located in said cavity to produce a second harmonic beam.

22. The side pumped pulsed Nd:YLF laser according to claim 1 further comprising a third harmonic generator located in said cavity to produce a third harmonic beam.

23. The side pumped pulsed Nd:YLF laser according to claim 1 further comprising; a fourth harmonic generator located in said cavity to produce a fourth harmonic beam.

24. The side pumped pulsed Nd:YLF laser according to claim 1 wherein said laser producing a pulse energy of 30 mj or greater per pulse.

25. The side pumped pulsed Nd:YLF laser according to claim 4 wherein said laser producing a pulse energy of 50 mj or greater.

26. The side pumped pulsed Nd:YLF laser according to claim 4 wherein said laser producing a pulse energy of 30 mj to 50 mj.

27. The side pumped pulsed Nd:YLF laser according to claim 4 wherein said lasing rod receives a linear power density from said diode bars of between about 40 to about 50 watts/cm.

28. A side pumped Nd:YLF laser comprising:
a) a laser cavity formed between a first and a second reflective surface;
b) said laser cavity having an optical axis;
c) a Q-switch located within the cavity;
d) at least one Nd:YLF lasing rod located within said cavity along said optical axis;
e) said lasing rod having a length of at least 90 mm;
f) diode bars extending along the length of said lasing rod and radially around the periphery of said lasing rod;
g) said diode bars having radiation outlets in optical communication with said lasing rod for supplying electromagnetic radiation on pumping paths to said rod;
h) said lasing rod receiving a linear power density from said diode bars of less than 50 watts/cm;
i) said pumping paths traversing substantially the entire length of said lasing rod substantially perpendicular to the direction of propagation of energy in the laser cavity;
j) said pumping paths traversing said lasing rod from at least two directions on substantially intersecting paths;
k) said laser capable of producing 30 mj or more per pulse;
l) said lasing rod receiving a linear power density from said diode bars of between about 40 to about 50 watts/cm.

29. The side pumped pulsed Nd:YLF laser according to claim 28 wherein said lasing rod receives a linear power density from said diode bars of between about 40 to about 45 watts/cm.

* * * * *